United States Patent [19]

Utsumi et al.

[11] Patent Number: 4,708,902

[45] Date of Patent: Nov. 24, 1987

[54] POLYESTER FILMS SUITABLE FOR USE IN MAGNETIC RECORDING MEDIA

[75] Inventors: Shigeo Utsumi, Yokohama; Tateo Kanesaki, both of Nagahama; Takashi Kagiyama, Yokohama; Satoshi Otonari, Machida; Koichiro Ikushima; Norio Okumura, both of Nagahama, all of Japan

[73] Assignee: Diafoil Company, Limited, Tokyo, Japan

[21] Appl. No.: 13,152

[22] Filed: Feb. 10, 1987

Related U.S. Application Data

[63] Continuation of Ser. No. 718,206, Apr. 2, 1985, abandoned, which is a continuation of Ser. No. 497,232, May 23, 1983, abandoned.

[30] Foreign Application Priority Data

Jun. 8, 1982 [JP] Japan ................................. 57-98121

[51] Int. Cl.$^4$ .............................................. G11B 5/62
[52] U.S. Cl. .................................. 428/141; 428/694; 428/900
[58] Field of Search ................ 427/129, 131; 428/141, 428/409, 694, 900, 910

[56] References Cited

U.S. PATENT DOCUMENTS

| | | | |
|---|---|---|---|
| 4,153,920 | 5/1979 | Shirahata et al. | 427/132 |
| 4,304,807 | 12/1981 | Kanakami et al. | 428/694 |
| 4,316,927 | 2/1982 | Kimura et al. | 428/216 |
| 4,338,367 | 7/1982 | Kanakami et al. | 428/694 |
| 4,348,446 | 9/1982 | Mitsuishi et al. | 428/694 |
| 4,439,479 | 3/1984 | Kanai et al. | 428/910 |
| 4,497,865 | 2/1985 | Minami et al. | 428/910 |

FOREIGN PATENT DOCUMENTS

| | | |
|---|---|---|
| 34207 | 3/1979 | Japan . |
| 41112 | 4/1979 | Japan . |
| 1433344 | 4/1976 | United Kingdom ................. 428/910 |
| 2087302A | 5/1982 | United Kingdom . |

*Primary Examiner*—George F. Lesmes
*Assistant Examiner*—William M. Atkinson
*Attorney, Agent, or Firm*—Oblon, Fisher, Spivak, McClelland, & Maier

[57] ABSTRACT

A polyester film suitable for use as a substrate for magnetic recording media, characterized in that said polyester film is a biaxially oriented polyester film having an average refractive index $\bar{n}$ and a planar orientation $\Delta P$, which respectively satisfy the following equations [I] and [II]:

$$\bar{n} \geq 1.600 \quad \text{[I]}$$

$$\Delta P \leq (1.43 \cdot \bar{n}) - 2.128 \quad \text{[II]}$$

and the surface roughness of the film is 0.015 μm or lower.

2 Claims, 1 Drawing Figure

POLYESTER FILMS SUITABLE FOR USE IN MAGNETIC RECORDING MEDIA

This application is a continuation of application Ser. No. 718,206, filed Apr. 2, 1985, now abandoned, which is a continuation of Ser. No. 497,232 filed May 23, 1983, now abandoned.

BACKGROUND OF THE INVENTION

1. Field of the Invention

This invention relates to polyester films suitable for use as substrates for magnetic recording media such as magnetic video tapes, magnetic video discs and floppy discs. More specifically, this invention relates to smooth and slippery polyester films having excellent performance in electromagnetic characteristics far superior to conventional polyester films and thus suitable for use as substrates for magnetic recording media as well as polyester films capable of permitting recording at still higher densities, excellent in travelling performance and suitable for use as substrates for magnetic recording media.

2. Description of the Prior Art

There has been made in recent years a striking achievement in the increase of recording density of magnetic recording media and efforts are still continued to allow recording at still higher densities.

Improvements have been made to magnetic materials to increase their recording densities. For example, the magnetic material has been improved from $\gamma$-Fe$_2$O$_3$ which is used in general audio tapes, floppy discs and the like, to CrO$_2$ having higher performance, and further to magnetic powder consisting mainly of pure iron which magnetic powder is commonly called the metallic magnetic material. Accompanied by such improvements to magnetic materials, developments of improved magnetic recording media are now under way including the so-called metal-coated magnetic recording media bearing magnetic layers, which contain pure metal as a principal component, applied on the surfaces thereof and magnetic recording media carrying metal thin layers containing no extra medium therein and formed 100% of ferromagnetic metal, which film layers have been formed by metal deposition on the surfaces of the magnetic recording media.

Biaxially oriented and heat-set polyethylene terephthalate films have been used as base films for high-density recording media similar to conventional magnetic tapes, owing to their good heat resistance, excellent mechanical strength and weathering resistance, and relatively inexpensive prices.

When producing magnetic recording media by forming ferromagnetic metal thin layers on the surfaces of such polyester films by coating or metal deposition, the polyester films are required to have far better surface characteristics compared with those of polyester films conventionally employed for magnetic tapes. Namely, it is necessary to make the recording wavelengths still shorter in order to increase the recording densities of magnetic tapes. Reflecting this requirement, the magnetic layers must be made thinner. For example, it is necessary to make the thickness of a coating thinner to about one half or less compared with conventional magnetic media formed principally of $\gamma$-Fe$_2$O$_3$ even if the magnetic layers are applied by the coating techinque, when a magnetic material consisting principally of pure ferromagnetic metal is used. In the case of magnetic recording media bearing thin film layers of a magnetic metal applied directly on the surfaces of their bases by deposition or the like, the the magnetic layers become still thinner by one figure and must be reduced to as thin as about 0.5 μm or so.

Where a magnetic layer is as thin as mentioned above, the surface roughness of its base film will lead to the surface unevenness of the resultant magnetic layer more directly compared with conventional magnetic layers. Thus, it is necessary to make the surfaces of polyester films, which are to be used in high density magnetic recording media, still smoother and more slippery compared with conventional polyester films. For example, in order to reduce the gap loss between a magnetic head and the surface of a magnetic layer to 1 dB or smaller when recording at such a short wavelength as 1 μm, it is necessary that the distance between the magnetic head and magnetic layer be 200 Å or shorter. As have been mentioned above, the surface smoothness of a polyester base film gives significant direct influence on electromagnetic characteristics such as video outputs, variations in output along the passage of time, omission of signals and/or outputs.

It has also been known that, even in the case of conventional magnetic tapes, one third of the surface roughness of projections of their base films, i.e., polyester films, will appear as roughness of the magnetic layers of resultant magnetic tapes. Accordingly, there is a continuing need for still smoother films having excellent and increased slipperiness. It is an essential requirement for improved electromagnetic characteristics of video tapes and for the production of high-quality magnetic tapes to make their base films, i.e., polyester films still smoother and excellent in slipperiness.

As another essential requirement for using a polyester film as the base film of a magnetic recording medium, the film surfaces are not supposed to have wrinkles or flaws. For these requirements to be satisfied the base film is required also to have, besides smoothness, good slipperiness, namely, a smaller friction factor, because a film having poor slipperiness are susceptible of causing flaws or wrinkles during its production, in the course of forming a magnetic layer by coating or deposition or otherwise handling the film. Such a film either cannot be used as a base film or, even if it should be used despite of such drawbacks, the production yield will be made extremely poor, thereby pushing up the production cost. Good slipperiness is required also after processing the film into magnetic tapes and the like for permitting smooth travelling of the magnetic tapes and the like when paying them out from reels or cassettes and winding them up on reels or cassettes. When a magnetic layer is rendered thinner to achieve high density recording as in video tapes produced by vacuum evaporation or their analogous products, surface defects such as flaws caused by such poor slipperiness, fold wrinkles, remains of tiny bubbles and the like will act as direct causes which will induce lowered electromagnetic characteristics, particularly, lowered video characteristics and increased dropout. Thus, production of magnetic tapes with a base film having poor slipperiness will cause serious deleterious effects to recording and reproduction due to lowered travelling performance.

As has been described above, a polyester film to be used as a base film for magnetic recording media is required to satisfy mutually-contradictory surface characteristics, i.e., to achieve smoothness as much as possible on one hand and to impart slipperiness as much as feasible on the other hand. Conventional magnetic tapes also need to meet such requirements to varied extents. However, the present requirements have become stringent to such high extent when compared with those required before, that the polyester film is now required to provide for further quality improvement and high density recording. In other words, the slipperiness of conventionally known polyester films will be abruptly lowered if they are rendered smooth to improve their electromagnetic characteristics. Accordingly, a coating called "back coat" is applied to the surface opposite to the magnetic surface of a polyester base film in order to impart slipperiness thereto so that the qualities of resultant magnetic tapes would be improved. However, this is cumbersome and thus disadvantageous from the industrial standpoint. In the case of vacuum-deposited metal thin-film tapes, they would become unsuitable for further application as magnetic tapes even if their surfaces opposite to their magnetic layers are rendered slippery by certain technique, unless the travelling performances between their magnetic layers and corresponding heads are improved. Therefore, it has been waited for the development of films whose slipperiness reduction remains at low levels even when their surface smoothness is increased.

SUMMARY OF THE INVENTION

Accordingly, the present inventors have carried out an extensive research as to polyester films, which are useful as base films for magnetic tapes, with a view toward improving the qualities of magnetic tapes and materializing high density recording. As a result, it has been found that a polyester film having excellent surface characteristics, e.g., good slipperiness (travelling performance) may be obtained by making its average refractive index ($\bar{n}$), a planar orientation ($\Delta P$) and surface roughness fall within certain specific ranges, leading to the present invention.

Therefore, the present invention relates to a polyester film suitable for use as substrates for magnetic recording media, which polyester film is characterized in that said polyester film is a biaxially oriented polyester film having an average refractive index $\bar{n}$ and a planar orientation $\Delta P$, which respectively satisfy the following equations [I] and [II]: PS $$\bar{n} \geq 1.600 \quad [\text{I}]$$

$$\Delta P \leq (1.43 \cdot \bar{n}) - 2.128 \quad [\text{II}]$$

and the surface roughness of the film is 0.015 μm or lower.

DETAILED DESCRIPTION OF THE PREFERRED EMBODIMENTS

Figure 1:
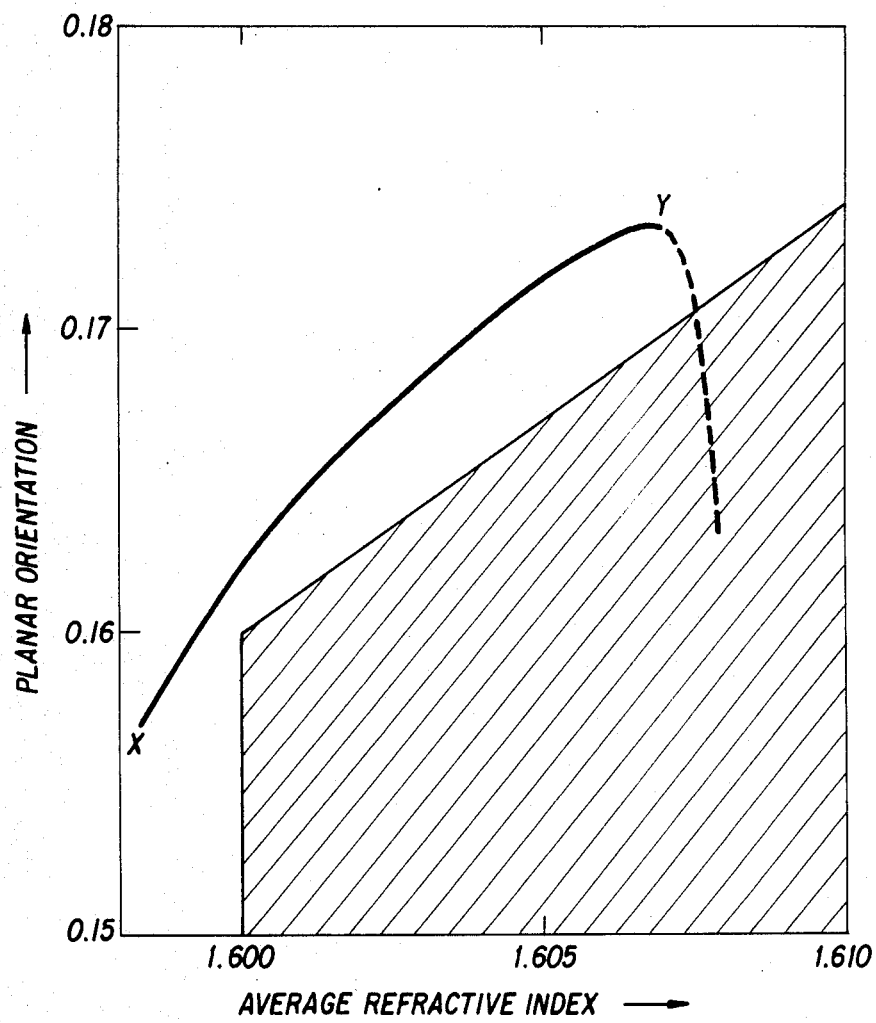
FIG. 1 is a graph showing the relationship between average refractive index and planar orientation, in which the shaded area indicates some films within the scope of this invention.

As the polyester making up the polyester film according to this invention, may be primarily mentioned a polyester containing terephthalic acid or 2,6-naphthalene dicarboxylic acid as its acid moiety. It is also feasible to use at least 80 mol % of terephthalic acid or 2,6-naphthalene dicarboxylic acid in combination with not more than 20 mol %, and preferably not more than 10 mol % of one or more bifunctional acids such as isophthalic acid, phthalic acid, adipic acid, sebacic acid, succinic acid, oxalic acid, malonic acid, p-hydroxybenzoic acid, ω-hydroxycaproic acid, etc. It is also possible to use a polyester making use of both terephthalic acid and 2,6-naphthalene dicarboxylic acid.

Ethylene glycol is considered to be a principal source for the glycol moiety. It is also feasible to use at least 80 mol %, and preferably at least 90 mol % of ethylene glycol in combination with not more than 20 mol %, and preferably not more than 10 mol % of one or more diol compounds such as, for example, trimethylene glycol, hexamethylene glycol, cyclohexane dimethanol(1,4), 2,2,4,4-tetramethylcyclobutanediol(2,4), hydroquinone, polyethylene glycol, polytetramethylene glycol and the like. The glycol moiety may also be a mixture of polymers of the above-mentioned diol compounds.

The above described polyester may also contain, besides an ester exchange catalyst and polymerization catalyst, a stabilizer such as phosphoric acid, phosphorous acid or an ester thereof, ultraviolet absorbent, delustering agent such as titanium dioxide, fine particulate silica, kaolin or calcium carbonate, and/or lubricant as needed.

The average refractive index $\bar{n}$ is represented by the following equation:

$$\bar{n} = \tfrac{1}{3} \cdot (n\alpha + n\beta + n\gamma)$$

in which
  $n\alpha$: refractive index in the thickness direction;
  $n\gamma$: refractive index in the direction of the main orientation; and
  $n\beta$: refractive index in a direction perpendicular to the direction of the main orientation.

On the other hand, the surface orientation $\Delta P$ is given using the above-described $n\alpha$, $n\beta$, and $n\gamma$ as follows:

$$\Delta P = \frac{n\beta + n\gamma}{2} - n\alpha$$

The average refractive index must be at least 1.600, with a value between 1.605 and 1.610 (inclusive) being preferred.

If the average refractive index $\bar{n}$ is smaller than 1.600, the polyester film is not preferred because it shows poor heat resistance and undergoes thermal failure in the calendering step, which is carried out after the coating step, or in the vacuum-evaporation step. When producing high density magnetic recording media in accordance with the vacuum-evaporation technique, this thermal failure is under particularly severer conditions and the average refractive index is preferably 1.6050 or higher. Any average refractive indexes greater than 1.610, however, tend to make the mechanical strength of resultant films poorer.

On the other hand, the planar orientation $\Delta P$ and $\bar{n}$ must satisfy the relationship expressed by the following equation:

$$\Delta P \leq (1.43 \cdot \bar{n}) - 2.128 \quad [\text{II}]$$

It has surprisingly been found that, in films having projections of the same average height, the friction coefficient of a film whose $\Delta P$ satisfies the above equation is far superior to that of a film whose $\Delta P$ falls outside the range defined by the above equation. In other words, among films having the same friction coefficient, the average height of projections of a film satisfying the above equation is far smaller compared with the average height of projections of another film whose ΔP falls outside the range defined by the above equation, namely, is smoother than the latter. In addition, when using a polyester film as a base film for still quality-improved magnetic tapes or high-density magnetic tapes, the surface roughness must be 0.015 μm or smaller. If the surface roughness should be greater than 0.015 μm, it is so large that they deleteriously affect the electromagnetic characteristics and others of resulting magnetic tapes.

Here, among films having the surface roughness of 0.015 μm or less, it is dependent on the nature of each end use which films, classified in accordance with their surface roughness should be used to make which magnetic tapes. Films may thus be suitably selected. However, daringly classifying, films having projections which fall within a relatively high range of the surface roughness of 0.015 μm or less may be used for high-grade video tapes having electromagnetic characteristics superior to conventional video tapes, while films having projections which fall within a relatively low range of the surface roughness, for example, which are 0.008 μm or less may preferably be used for magnetic recording media whose thin magnetic metal films are to be formed by the vacuum evaporation, sputtering or ion-plating technique. Films having projections which fall within the intermediate range of the above-mentioned surface roughness may preferably be used for the so-called ferromagnetic metal-coated magnetic recording media. Accordingly, polyester films according to this invention are excellent films applicable for a wide variety of magnetic tapes which are currently being developed.

Thus, the present invention can provide films which exhibit excellent travelling performance, contribute to improvements in the electromagnetic characteristics of conventional magnetic tapes as well as improvements in the electromagnetic characteristics of high density magnetic tapes, by controlling their average refractive indexes, planar orientations and surface roughness within their respective ranges defined in the present invention.

Although polyester films according to this invention may be produced by any suitable method, it is preferable, specifically speaking, to use a raw material polymer which either contains extremely fine particles or is practically free of any particles. To obtain a raw material resin containing extremely fine particles, it is preferable, for example, to form fine particles with a calcium compound or a calcium and lithium compounds as well as a catalyst residue of a phosphorus compound in the polymerization step of a polyester; to add extremely fine inorganic particles such as an inert particulate additive of 200 mμ or smaller, e.g., ultrafine silica powder or the like so as to permit them to be present in films; or to effecting polymerization separately by varying the amounts of the phosphorus component and other additives and then blending the resultant two or more polyesters together.

When incorporating an inert particulate additive in a polyester which is the starting material for a polyester film according to this invention, it may be added before or during the polymerization of the polyester. It may also be added when melt-extruding the polyester in a sheet-like form so as to disperse same in an extruder and then extrude the polyester from the extruder. However, it is preferable to add such an inert particulate additive prior to polymerization.

On the other hand, as a polyester resin practically free of particles, may be suitably employed a polyester produced while avoiding precipitation of a catalyst residue of a phosphorus compound by means of an ester exchange catalyst such as, for example, a magnesium compound, manganese compound or zinc compound; or in accordance with the direct polymerization method without using any esterification catalyst. Antimony compounds, germanium compounds, titanium compounds, tin compounds and the like may be used as polymerization catalyst but there is no particular limitation as to the type of polymerization catalyst.

The essential features of this invention reside in that extremely slippery films may be obtained when ΔP is controlled within the range defined in this invention, surprisingly, even in the case of films practically free of particles as mentioned above, and to say nothing of films having minute projections on their surfaces.

A biaxially oriented polyester film of this invention may be obtained by extruding a polyester in a manner commonly known in the art, stretching the thus-extruded polyester sequentially or simultaneously in two directions, and, if necessary, stretching further in the longitudinal or transverse direction, and then heat-setting the thus-stretched polyester at temperatures of 180° C. and higher. The largest characteristic feature of the biaxially oriented polyester film of this invention resides in that the relationship between its average refractive index and planar orientation falls within a certain specific range.

Namely, FIG. 1 illustrates diagrammatically the relationship between the average refractive index and planar orientation of a polyester film. The planar orientation increases generally as the average refractive index becomes greater. Under usual stretching conditions, their relationship remains uniform and moves merely on the solid line X-Y. A small increase in surface smoothness will result in a sudden and significant reduction in slipperiness.

It has however been first found by the present inventors that good slipperiness is available even with a smooth film having surface roughness of 0.015 μm or less so long as the relationship between its average refractive index and planar orientation remains within the specific area (for example, the shaded area) located in a lower right part relative to the line X-Y as shown in FIG. 1, although its reasons have not been fully elucidated.

It is difficult to obtain a film of this invention as that mentioned above under the commonly-employed orientation conditions. It may however be obtained in accordance with various methods, for example, by making the longitudinal orientation temperature higher by 5°–30° C. than usual temperatures, i.e., to 100°–120° C. when biaxially orienting the film sequentially in the order of the longitudinal direction and the transverse direction; or by relaxing the film to considerable extents in the longitudinal or transverse direction or both directions either prior or subsequent to its heat-setting.

Furthermore, use of a heat-setting temperature of 235° C. or higher causes the planar orientation ΔP to drop abruptly while the average refractive index $\bar{n}$ remains constant, namely, such a high heat-setting temperature causes the film to show the behavior indicated by a dotted line in FIG. 1. By following the above-mentioned method, it is also feasible to obtain a film having an average refractive index n̄ and planar orientation ΔP respectively within the ranges specified in the present invention.

Needless to say, adoption of these methods does not fully satisfy the characteristics of this invention. Since the average refractive index and planar orientation are affected by the conditions for a film-making machine, for example, film-making speed and stretching width as well as those for the raw material polyester, e.g., the extent of copolymerization, crystallization velocity, etc. Therefore, it is necessary to make suitable selection as to these conditions so as to meet the requirements of the present invention.

Various methods may be used to carry out the heat-setting, including heating a film in a tenter while circulating air or an inert gas therethrough, passing through a film near the heated matter or bringing a film into contact with the surface of a heated roller. It is preferable to carry out the heat-setting stage in several stages by providing a cooling step between each two heat-setting steps, as well as to carry out the heat-setting at a constant temperature.

Polyester films according to this invention may be suitably used as base films for high-grade magnetic recording media having better electromagnetic characteristics than conventional recording media and the so-called metal-coated and metal-deposited magnetic recording media each bearing a ferromagnetic metal thin layer, coated on the surface thereof. Suitable film thickness ranges from 2–50 μm.

As a method for forming ferromagnetic metal thin layers, it is preferable to employ, for example, the vacuum evaporation, sputtering, or ion-plating technique or the like. It is suitable to use, as a ferromagnetic metal material, iron, cobalt or nickel or an alloy thereof.

As exemplary products provided with these magnetic recording layers, may be mentioned magnetic tapes, floppy discs, video discs, etc.

Having generally described the invention, a more complete understanding can be obtained by reference to certain examples which are provided herein for purposes of illustration only and are not intended to be limiting in any manner.

The measuring methods used in the present specification to obtain various physical data will next be described.

1. Haze of solution:

The haze was measured by dissolving 2.7 g of each polymer in 20 ml of a 60:40 mixed solvent of phenol and tetrachloroethane and using a haze meter (Model: SR type) made by Nippon Denshoku K.K. The cell size was 1 cm.

2. Surface roughness:

Using a thin film step meter made by Kosaka Kenkyusho K.K. (Model: ET-10), cross-sectional curves were drawn with the longitudinal magnification of ×500,000, the transverse magnification of ×200, and a needle pressure of 50 mg or lighter. Center line average value of the surface profile of the film (in other words, arithmetric mean deviation), Ra was determined in accordance with the procedure prescribed in JIS-B0601.

3. Measurement of friction coefficient (μ):

Each film was brought into contact at the winding angle of 135° (θ) with a metal pin having the diameter of 4 mm and surface finish of 0.2S and made of SUS 420. The film was traveled at the speed of 880 mm/min while applying the load of 22.3 g (W) to one end of the film, while the resistance (F) was measured at the other end. The friction coefficient was calculated in accordance with the following equation:

$$\mu = (1/\theta) \ln (F/W) = 0.424 \ln (F/22.3)$$

4. Refractive index:

The refractive index was measured at 23° C. using the Na D-line, using an Abbe refractometer.

COMPARATIVE EXAMPLES 1 AND 2

One hundred parts of dimethyl terephthalate, 60 parts of ethylene glycol, 0.09 part of calcium acetate monohydrate and 0.18 part of lithium acetate dihydrate were charged in a reactor and then allowed to undergo an ester exchange reaction. Assuming the time point, at which the interior temperature had reached 150° C., as the initiation time point of the reaction, the temperature of the contents was raised to 200° C. in 2 hours and to 230° C. in additional 2 hours.

Upon completion of the ester exchange reaction, orthophosphoric acid and triethylphosphate (molar ratio of orthophosphoric acid to triethylphosphate=1:6) were added so as to make P/Ca+½Li (each being the mole number) be 1, followed by a further addition of 0.04 part of antimony trioxide. A polycondensation reaction was then carried out in a manner commonly known in the art. Namely, the reaction temperature was gradually raised from the initial 230° C. of the reaction to the final 285° C. On the other hand, the pressure was gradually lowered to final 0.5 mm Hg. Upon an elapsed time of 4.5 hours, the reaction was stopped and the interior was allowed to have its original pressure. The thus-prepared polymer was taken out of the reactor and formed into chips. The chip haze of these chips was found to be 13.8%.

These chips were dried in vacuo at 160° C. for 10 hours. They were molten at 290° C. and extruded through a T-die and quenched, thereby obtaining an unstretched film. This film was then stretched at 94° C. by 3.7 times in the longitudinal direction and then at 105° C. by 3.5 times in the transverse direction. The thus-stretched film was then heat-set for 10 seconds at 222° C., thereby obtaining a biaxially oriented film of 14.5 μm in thickness. The average refractive index n̄, planar orientation ΔP, surface roughness Ra and friction coefficient μ of the thus-obtained film were measured. Results are shown as Comparative Example 1 in Table 1.

Next, an unstretched film obtained in the same manner as in Comparative Example 1 was stretched first at 88° C. by 1.4 times in the longitudinal direction. It was heat-treated at 107° C. to relax the orientation. It was then stretched at 115° C. by 1.7 times in the final longitudinal direction. Thereafter, it was stretched at 130° C. by 3.8 times in the transverse direction. The thus-oriented film was heat-set for 10 seconds at 225° C., thereby obtaining a biaxially-oriented film of 14.5 μm in thickness. With respect to the thus-obtained film, its average refractive index n̄, planar orientation ΔP, surface roughness Ra and friction coefficient μ were also measured. Measurement results are given as Comparative Example 2 1 in Table 1.

TABLE 1

| Sample | Physical properties | | | |
|---|---|---|---|---|
| | n̄ | ΔP × 10³ | Ra (μm) | μ |
| Comp. Ex. 1 | 1.6052 | 173 | 0.012 | 0.384 |

TABLE 1-continued

| Sample | Physical properties | | | |
|---|---|---|---|---|
| | $\bar{n}$ | $\Delta P \times 10^3$ | Ra (μm) | μ |
| Comparative Example 2 | 1.6052 | 154 | 0.011 | 0.270 |

COMPARATIVE EXAMPLE 3 AND EXAMPLES 1 AND 2

An unstretched film was prepared in the same manner as in Comparative Example 1, using 0.095 part of calcium acetate monohydrate and 0.069 part of ethyl acid phosphate as ester exchange catalysts. Here, the haze of the solution was 2%.

The thus-obtained film was first stretched in the same manner as in Comparative Example 1, i.e., at the temperature of 94° C. by 3.7 times in the longitudinal direction and then at 105° C. by 3.8 times in the transverse direction, followed by its heat setting at 235° C. and for 5 seconds. Thus, a film of 12 μm in thickness was obtained. Its average refractive index ($\bar{n}$), planar orientation ($\Delta P$), surface roughness (Ra) of projections and friction coefficient ($\mu$) were measured. Measurement results are given as Comparative Example 3 in Table 2.

On the other hand, the above unstretched film was first stretched, following the procedure of Comparative Example 2, at 88° C. by 1.4 times in the longitudinal direction. After heat-treating the film at 107° C., it was stretched again at 100° C. by 1.7 times in the longitudinal direction, and then stretched at 130° C. by 3.5 times in the transverse direction. The thus-oriented film was heat-set at 235° C. for 5 seconds, thereby obtaining a film of 12 μm thickness. The average refractive index ($\bar{n}$), planar orientation ($\Delta P$), surface roughness (Ra) and friction coefficient ($\mu$) of the film were also measured. Measurement results are given as Example 1 in Table 2.

Next, another biaxially oriented and heat-set film was obtained in the same manner as in Example 1 except that the stretching temperature of the final longitudinal stretching step was raised to 115° C. Each of the physical values of the film was also determined. The thus-obtained physical values are shown as Example 2 in Table 2.

TABLE 2

| Sample | Physical properties | | | |
|---|---|---|---|---|
| | $\bar{n}$ | $\Delta P \times 10^3$ | Ra (μm) | μ |
| Comp. Ex. 3 | 1.6067 | 173 | ≦0.002 | unable to measure |
| Example 1 | 1.6070 | 165 | ≦0.002 | 1.0 |
| Example 2 | 1.6068 | 153 | ≦0.002 | 0.5 |

Having now fully described the invention, it will be apparent to one of ordinary skill in the art that many changes and modifications can be made thereto without departing from the spirit or scope of the invention as set forth herein.

What is claimed as new and intended to be covered by Letters Patent is:

1. In a magnetic recording medium comprising a base film as a main constructive layer of a biaxially oriented polyethylene terephthalate film and a ferromagnetic layer provided at least on one of the surfaces of said base film, the improvement comprising that the base film satisfies the following relations (I), (II) and (III) describing an average refractive index $\bar{n}$ and, a planar orientation $\Delta P$, and a surface roughness Ra:

$$\bar{n} \geq 1.605 \qquad (I)$$

$$\Delta P < (1.43 \cdot \bar{n}) - 2.128 \qquad (II)$$

$$Ra \leq 0.008 \, \mu m \qquad (III).$$

2. The magnetic recording medium of claim 1 wherein the average refractive index $\bar{n}$ is:

$$\bar{n} \leq 1.610.$$

* * * * *